United States Patent
Larijani et al.

(10) Patent No.: US 10,129,861 B2
(45) Date of Patent: Nov. 13, 2018

(54) DOWNLINK CONTROL CHANNEL RESOURCE ALLOCATION

(71) Applicant: Telefonaktiebolaget LM Ericsson (publ), Stockholm (SE)

(72) Inventors: Parsa Larijani, Ottawa (CA); Scott Gibson, Ottawa (CA); Roger Mah, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 14/889,349

(22) PCT Filed: Oct. 12, 2015

(86) PCT No.: PCT/IB2015/057796
§ 371 (c)(1),
(2) Date: Nov. 5, 2015

(87) PCT Pub. No.: WO2017/064533
PCT Pub. Date: Apr. 20, 2017

(65) Prior Publication Data
US 2017/0171839 A1   Jun. 15, 2017

(51) Int. Cl.
*H04W 72/04* (2009.01)
*H04W 74/00* (2009.01)
*H04W 72/12* (2009.01)
*H04L 5/00* (2006.01)

(52) U.S. Cl.
CPC ......... *H04W 72/042* (2013.01); *H04L 5/0035* (2013.01); *H04L 5/0053* (2013.01);
(Continued)

(58) Field of Classification Search
CPC ............. H04W 72/042; H04W 74/006; H04W 72/1289; H04W 74/008; H04W 72/1226; H04L 5/0035
See application file for complete search history.

(56) References Cited

U.S. PATENT DOCUMENTS

| | | | |
|---|---|---|---|
| 2011/0188463 A1* | 8/2011 | Kim | H04W 72/04 370/329 |
| 2013/0107816 A1* | 5/2013 | Iraji | H04W 72/042 370/329 |

(Continued)

OTHER PUBLICATIONS

Ye et al.—"Enhanced Physical Downlink Control Channel in LTE Advanced Release 11" Published in IEEE Communications Magazine vol. 51(2), ISSN: 0163-6804, pp. 82-89, LTE Technology Update: Part 2, Date of Publication: Feb. 14, 2013 consisting of 8-pages.

(Continued)

*Primary Examiner* — Alex Skripnikov
*Assistant Examiner* — Sharmin Chowdhury
(74) *Attorney, Agent, or Firm* — Christopher & Weisberg, P.A.

(57) ABSTRACT

A method and node for power efficient allocation of enhanced physical downlink control channel resources are disclosed. According one aspect, a method at a network node of allocating an enhanced control channel to a first wireless device is provided. The method includes determining a control channel subframe pattern for the first wireless device. The subframe pattern for the first wireless device includes at least an indication of a pattern of subframes during which the first wireless device is to monitor the enhanced control channel for downlink control information. The subframe pattern is based at least in part on enhanced control channel subframe utilization of other wireless devices. The method also includes transmitting the control channel subframe pattern to the first wireless device, and transmitting the downlink control channel information to the first wireless device over the enhanced control channel according to the enhanced control channel subframe pattern.

20 Claims, 12 Drawing Sheets

(52) U.S. Cl.
CPC ......... *H04L 5/0094* (2013.01); *H04L 5/0096*
(2013.01); *H04W 72/1226* (2013.01); ***H04W
72/1289* (2013.01); *H04W 74/006*** (2013.01);
*H04W 74/008* (2013.01)

(56) References Cited

U.S. PATENT DOCUMENTS

2013/0301562 A1* 11/2013 Liao ................... H04W 72/042
370/329
2013/0343307 A1* 12/2013 Desai ................... H04W 74/04
370/329
2014/0086112 A1* 3/2014 Stern-Berkowitz .........................
H04W 72/1289
370/280

2014/0112290 A1 4/2014 Chun et al.

OTHER PUBLICATIONS

International Search Report and Written Opinion dated Jun. 27, 2016 for International Application Serial No. PCT/IB2015/057796, International Filing Date—Oct. 12, 2015 consisting of 11-pages.
3GPP TSG RAN WG1 Meeting #68, R1-120330, Dresden, Germany, Title: Search Space Design for E-PDCCH, Source: Research in Motion, UK Limited (RIM), Agenda Item: 7.6.3, Document for Discussion, Feb. 6-10, 2012 consisting of 6-pages.
3GPP TSG RAN WG1 Meeting #70, R1-123526, Qingdao, China, 13th—Agenda item: 7.6.1, Source: LG Electronics, Title: Consideration on DCI mapping for EPDCCH, Document for: Discussion and Decision, Aug. 17, 2012 consisting of 7-pages.

* cited by examiner

FIND N LEAST USED ENHANCED CONTROL CHANNEL SUBFRAMES
EXAMPLE: PATTERN LENGTH =10, NUMBER OR REQUIRED SUBFRAMES =2

| 5 | 5 | 0 | 3 | 5 | 10 | 3 | 3 | 2 | 3 | — R1 |

BASED ON NUMBER OF USERS ASSIGNED TO EACH SUBFRAME

| 10% | 50% | 0% | 50% | 10% | 20% | 30% | 10% | 10% | 0% | — R2 |

BASED ON ENHANCED CONTROL CHANNEL COLLISION RATE

FIG. 12

DOWNLINK CONTROL CHANNEL RESOURCE ALLOCATION

TECHNICAL FIELD

Wireless communications and in particular to power efficient allocation of enhanced physical downlink control channel resources.

BACKGROUND

In Release 10 of long term evolution (LTE) wireless communication system standards and prior releases, the physical downlink control channels (PDCCH) carry all of the downlink (DL) and uplink (UL) scheduling information to inform individual wireless devices where to find information in the time and frequency resources utilized for transmissions between the wireless devices and a base station, such as an eNodeB (eNB).

Such a typical wireless communication system 10 is shown in FIG. 1. A network node 12, often referred to as a base station, is in communication with a backhaul network 14. The backhaul network 14 may include the Internet and/or the public switched telephone network (PSTN). The network node 12 communicates with a plurality of wireless devices 16a, 16b and 16c, referred to collectively herein as wireless devices 16. Although only one base station 12 is shown, an actual wireless communication system 10 has many base stations. Also, there will typically be more than three wireless devices 16.

In communication systems based on LTE standards, downlink communications between the network node 12 and the wireless devices 16 are based on a basic radio frame an example of which is illustrated in FIG. 2. A basic radio frame generally includes 20 slots which are paired together to form subframes. With additional reference to FIG. 3, each slot of the basic radio frame generally includes multiple resource elements (REs) which can be illustrated as a resource grid including multiple frequency carriers and multiple orthogonal frequency division multiplexing (OFDM) symbols. In the resource grid, one RE denotes a single OFDM symbol transmitted over a single frequency carrier. As illustrated in FIG. 3, OFDM symbols and frequency carriers can be grouped as resource blocks (RBs). An LTE RB generally includes 7 OFDM symbols over 12 frequency carriers for a total of 84 REs per RB. However, these quantities can vary.

When two slots are combined into a subframe, as shown in FIG. 2, their combined resource elements are further divided into a control region which generally occupies the first 3 OFDM symbols (the first 4 OFDM symbols when the available bandwidth is 1.4 MHz) over the available bandwidth, i.e. over all the available frequency carriers, and a data region which occupy the remaining OFDM symbols, also over the available bandwidth. In FIG. 4, which illustrates an exemplary subframe, the shaded region is the control region while the non-shaded region is the data region.

The network node 12 generates and transmits a PDCCH which informs each wireless device 16 whether and when data is to be transmitted to the wireless device 16 or received from the wireless device 16. According to the aforementioned communication standards, a wireless device 16 must decode the PDCCH successfully in order to receive and send data. The PDCCH is located within the control region of a subframe which, as indicated above, usually occupies the first 3 OFDM symbols at the beginning of each transmitted subframe.

The capacity of the PDCCH is a limiting factor in systems where there are a large number of wireless devices using low rate services such as voice over Internet protocol (VoIP). Indeed, due to the limited size of the control region, the number of PDCCHs than can be transmitted in any given subframe is limited. To alleviate the limitations of the control region, Release 11 of the LTE communication standards introduces an enhanced PDCCH (ePDCCH) that employs frequency division multiplexing (FDM) and that can be allocated dynamically within the data region of a subframe in which the data are transmitted over physical downlink shared channels (PDSCH).

The introduction of the ePDCCH poses challenges to achieving power efficiency in a wireless device. Modern wireless device receivers employ "micro-sleep" techniques to conserve battery power. These techniques allow the wireless device to power down its radio frequency (RF) components when the wireless device does not expect to receive and decode any data in a frame. The wireless device employs fast decoding of the PDCCH to determine if the wireless device is scheduled to receive and decode data during the frame. If not, the wireless device stops buffering data of the PDSCH transmitted in the data region and sleeps during the remainder of the sub frame.

However, these micro-sleep techniques are not possible when the ePDCCH is used because the ePDCCH is distributed in the data region over the entire duration of the subframe, forcing the wireless device to remain awake and monitor the entire subframe for the ePDCCH before it can decode the scheduling data contained in the ePDCCH.

Thus, a wireless device that is assigned an ePDCCH channel will experience increased power consumption and increased processing load as compared with communication techniques that do not employ ePDCCH, because the wireless device must decode the ePDCCH that spans over the entire frame duration.

SUMMARY

Some embodiments advantageously provide a method and system for power efficient allocation of enhanced physical downlink control channel resources. According one aspect, a method, at a network node, of allocating an enhanced control channel to a first wireless device is provided. The method includes determining a control channel subframe pattern for the first wireless device. The subframe pattern for the first wireless device includes at least an indication of a pattern of subframes during which the first wireless device is to monitor the enhanced control channel for downlink control information. The subframe pattern is based at least in part on enhanced control channel subframe utilization by other wireless devices. The method also includes transmitting the control channel subframe pattern to the first wireless device, and transmitting downlink control information to the first wireless device over the enhanced control channel according to the control channel subframe pattern.

According to this aspect, in some embodiments, the method further includes transmitting downlink control information to the first wireless device over a primary control channel in accordance with the control channel subframe pattern. In some embodiments, the control channel subframe pattern further comprises an indication of the subframes during which the first wireless device is to monitor the primary control channel for downlink control information. In some embodiments, determining the control channel subframe pattern comprises determining a location of subframes in the subframe pattern during which the first wireless device is to monitor the enhanced control channel for downlink control information. In some embodiments, determining the location of subframes in the subframe pattern during which the first wireless device is to monitor the enhanced control channel for downlink control information comprises determining which subframes in a combination of subframe patterns determined for other wireless devices are the least used.

In some embodiments, determining the control channel subframe pattern comprises determining a number of subframes in the subframe pattern during which the first wireless device is to monitor the enhanced control channel for downlink control information. In some embodiments, the number of subframes in the subframe pattern during which the first wireless device is to monitor the enhanced control channel for downlink control information is based at least in part on a utilization ratio of radio resources available for a primary control channel. In some embodiments, the number of subframes in the subframe pattern during which the first wireless device is to monitor the enhanced control channel for downlink control information is based at least in part on a utilization ratio of radio resources available for the enhanced control channel. In some embodiments, the determination of the control channel subframe pattern is performed in response to a trigger. In some embodiments, the trigger may be a change in network conditions. In some embodiments, the change in network conditions comprises a change in usage of one of primary control channel radio resources and enhanced control channel radio resources. In some embodiments, the change in network conditions comprises primary control channel radio resources usage exceeding a predetermined threshold.

According to another aspect, some embodiments include a network node configured to allocate an enhanced control channel to a first wireless device. In some embodiments, the network node includes processing circuitry comprising a processor and memory. The memory is configured to store a control channel subframe pattern. The processor is configured to determine a control channel subframe pattern for the first wireless device. The subframe pattern for the first wireless device includes at least an indication of a pattern of subframes during which the first wireless device is to monitor the enhanced control channel for downlink control information. The subframe pattern is based at least in part on enhanced control channel subframe utilization by other wireless devices. The network node includes a transmitter configured to transmit the control channel subframe pattern to the first wireless device, and transmit downlink control information to the first wireless device over the enhanced control channel according to the control channel subframe pattern.

According to this aspect, in some embodiments, the transmitter is further configured to transmit downlink control information to the first wireless device over a primary control channel in accordance with the control channel subframe pattern. In some embodiments, the control channel subframe pattern further comprises an indication of the subframes during which the first wireless device is to monitor the primary control channel for downlink control information. In some embodiments, determining the control channel subframe pattern comprises determining a location of subframes in the subframe pattern during which the first wireless device is to monitor the enhanced control channel for downlink control information. In some embodiments, determining the location of subframes in the subframe pattern during which the first wireless device is to monitor the enhanced control channel for downlink control information comprises determining which subframes in a combination of subframe patterns determined for other wireless devices are the least used.

In some embodiments, determining the control channel subframe pattern comprises determining a number of subframes in the subframe pattern during which the first wireless device is to monitor the enhanced control channel for downlink control information. In some embodiments, the number of subframes in the subframe pattern during which the first wireless device is to monitor the enhanced control channel for downlink control information is based at least in part on a utilization ratio of radio resources available for a primary control channel. In some embodiments, the number of subframes in the subframe pattern during which the first wireless device is to monitor the enhanced control channel for downlink control information is based at least in part on a utilization ratio of radio resources available for the enhanced control channel. In some embodiments, the determination of the control channel subframe pattern is performed in response to a trigger. In some embodiments, the trigger may be a change in network conditions. In some embodiments, the change in network conditions comprises a change in usage of one of primary control channel radio resources and enhanced control channel radio resources. In some embodiments, the change in network conditions comprises primary control channel radio resources usage exceeding a predetermined threshold.

According to yet another aspect, some embodiments include a network node configured to allocate an enhanced control channel to a first wireless device. In some embodiments, the network node includes a control channel subframe pattern determination module configured to determine a control channel subframe pattern for the first wireless device, The subframe pattern for the first wireless device includes at least an indication of a pattern of subframes during which the first wireless device is to monitor the enhanced control channel for downlink control information. The subframe pattern for the first wireless device is based at least in part on enhanced control channel subframe utilization by other wireless devices. The network node also includes a transmitter module configured to transmit the control channel subframe pattern to the first wireless device, and transmit downlink control information to the first wireless device over the enhanced control channel according to the control channel subframe pattern.

According to this aspect, in some embodiments, determining the control channel subframe pattern comprises determining a location of subframes in the subframe pattern during which the first wireless device is to monitor the enhanced control channel for downlink control information. In some embodiments, determining the control channel subframe pattern comprises determining a number of subframes in the subframe pattern during which the first wireless device is to monitor the enhanced control channel for downlink control information.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein:

FIG. 12 is a diagram of exemplary subframe pattern arrangements from which least used subframes may be determined.

DETAILED DESCRIPTION

Figure 1:
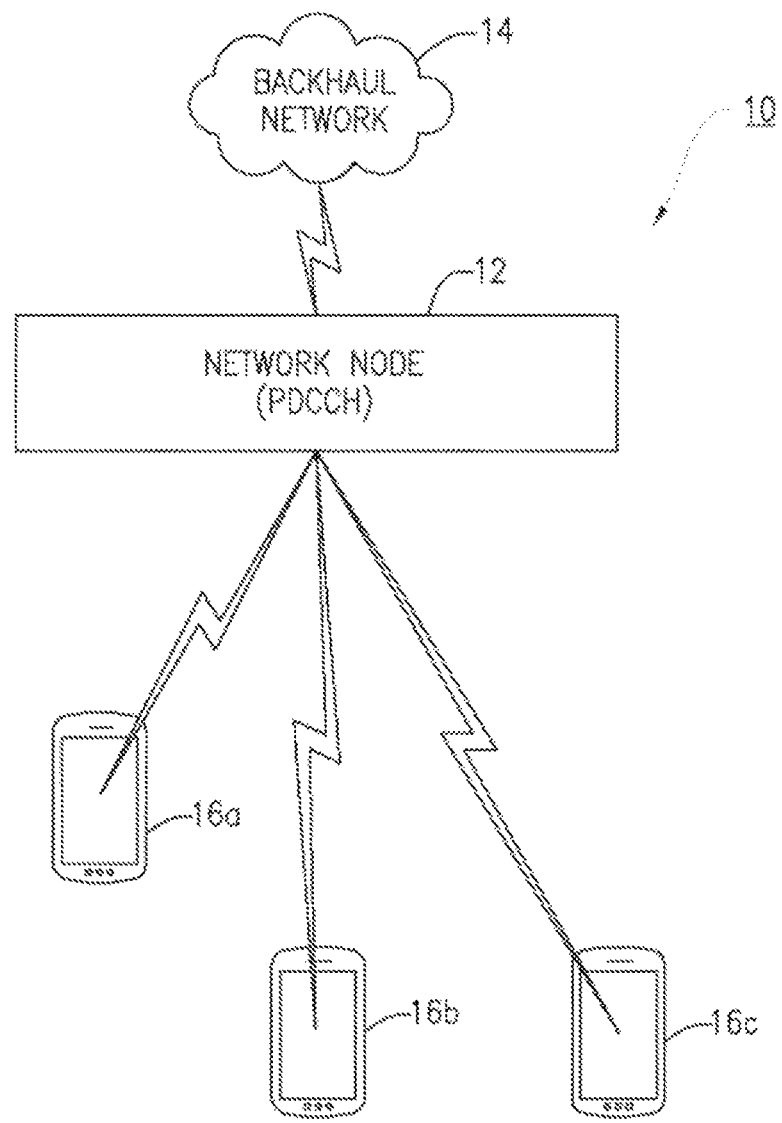
FIG. 1 is a block diagram of a known wireless communication system using a physical downlink control channel (PDCCH) for scheduling on the uplink and downlink.
Figure 2:
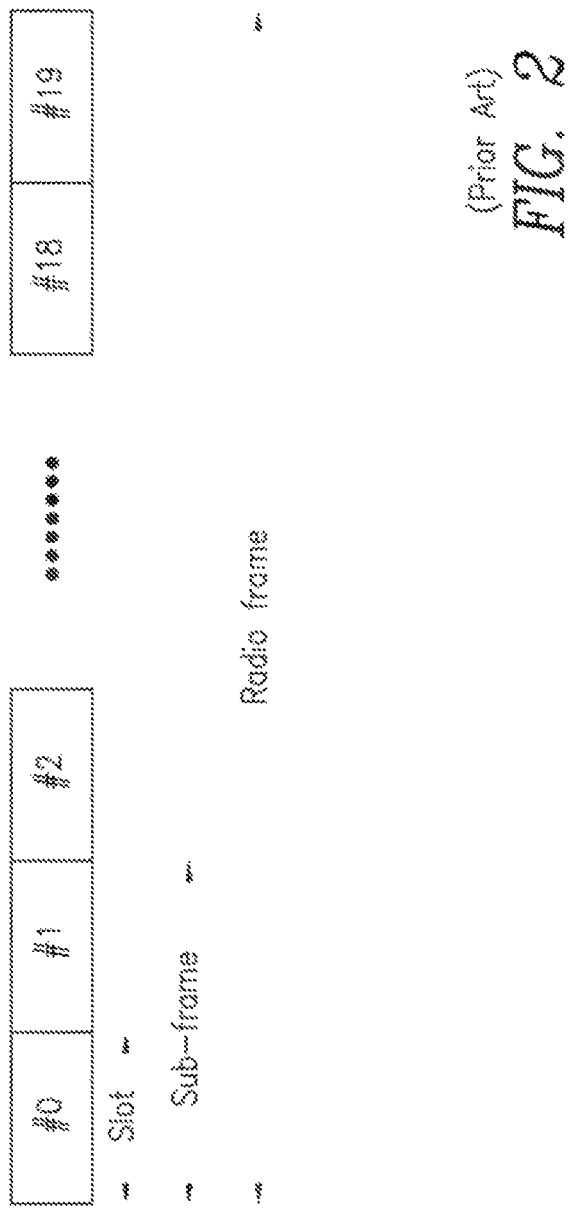
FIG. 2 is an illustration of a radio frame showing slots and subframes.
Figure 3:
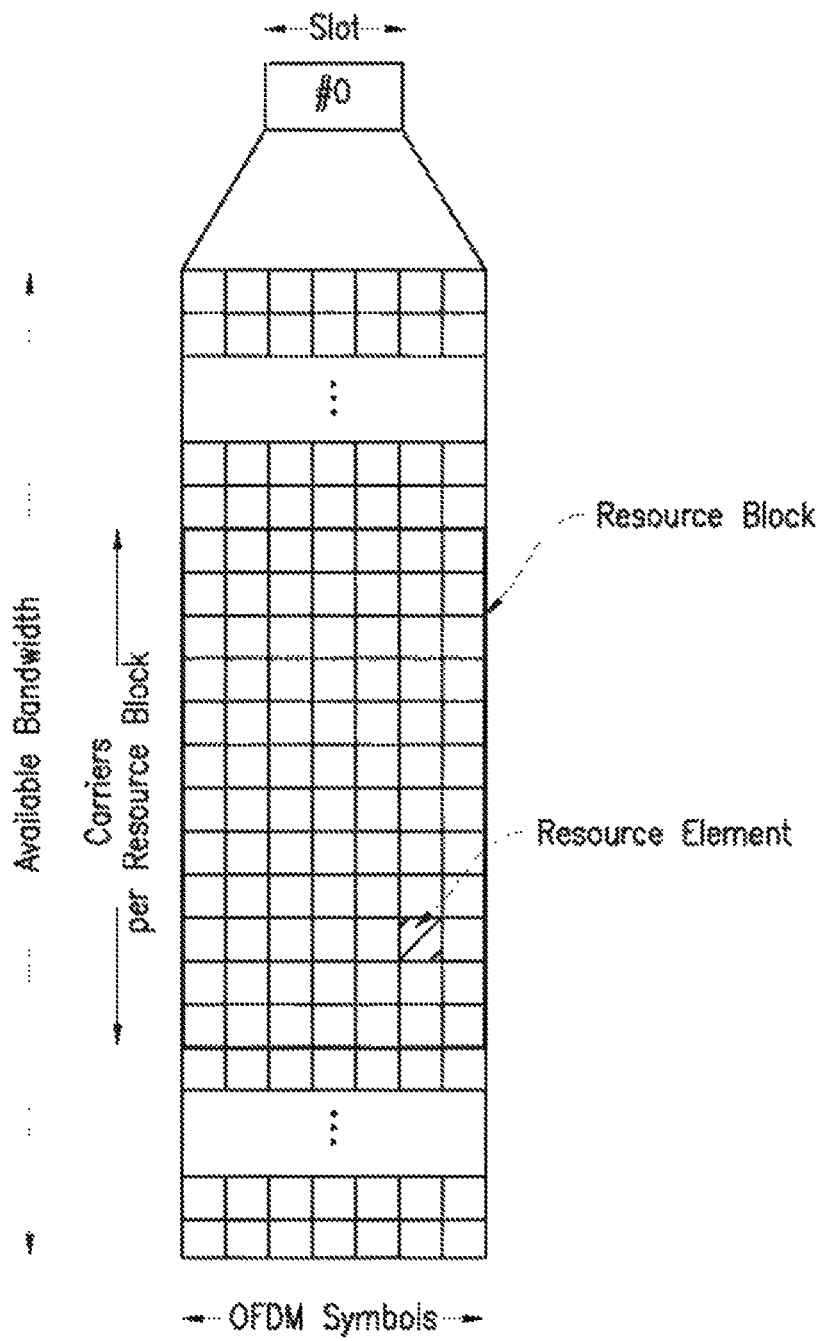
FIG. 3 is an illustration of a slot of a radio frame that includes a plurality of resource elements.
Figure 4:
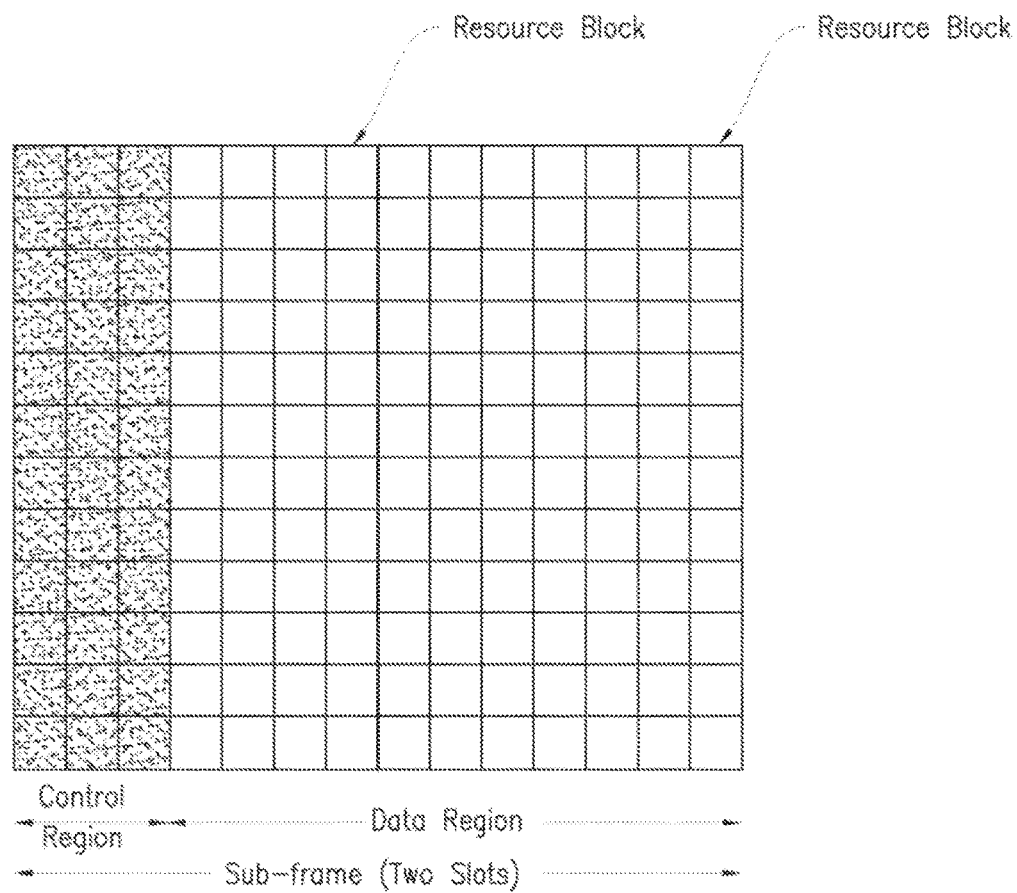
FIG. 4 illustrates an exemplary subframe having a control region and a data region

Before describing in detail exemplary embodiments, it is noted that the embodiments reside primarily in combinations of apparatus components and processing steps related to power efficient allocation of enhanced physical downlink control channel resources. Accordingly, the system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments described herein enable lower wireless device power consumption and lower processing load when using an enhanced control channel, such as the ePDCCH, as compared with existing techniques, while achieving the cell capacity improvements offered by the enhanced control channel. Some embodiments improve enhanced control channel usage by ensuring the enhanced control channel is evenly provisioned in the time domain. Some embodiments can readily be employed in current and future standard-compliant base stations, such as eNBs, and wireless devices.

Note that references to PDCCHs, ePDCCHs and eNBs is exemplary. Embodiments are not limited to LTE and may refer to primary control channels, enhanced control channels and base stations of other wireless access technologies. Henceforth, the term primary control channel may include but not be limited to a PDCCH, the term enhanced control channel may include but not be limited to an ePDCCH and the term base station may include but not be limited to an eNB. Again, these terms are not used solely in the sense of LTE communications and may apply to other communication technologies that make use of control channel(s) and enhanced control channel(s).

A time scheduling approach for determining a control channel subframe pattern and allocating enhanced control channel resources to the wireless devices that seeks to minimize or reduce the total time that a specific wireless device must use to receive the enhanced control channel for its connection, while providing the control channel gain for the cell and the base station as a whole, is provided. The wireless device is informed of which subframes the wireless device must monitor to receive and decode downlink control information transmitted by an enhanced control channel, thereby allowing micro-sleep or other power conservation techniques to reduce the power used by the wireless device over subframes identified as not carrying any enhanced control channel for the wireless device. Further, enhanced control channel blocking due to search space collisions can be reduced by reducing the number of wireless devices which share the same enhanced control channel radio resources in a specific subframe. Collisions occur when a control channel allocation is not possible due to the radio resources available to the wireless device being occupied by another wireless device.

In some embodiments, a set of resources, such as physical resource blocks (PRB), of a cell are dedicated for carrying enhanced control channels. This set of resources is shared between a pool of wireless devices in the time domain by assigning each of the wireless devices to one or more subframes according to a pattern. Note that although reference is made to subframes, the embodiments described herein may utilize time slots, generally, in which to distribute or otherwise assign the wireless devices. In other words, "time slots" and "subframes" are used interchangeably and the embodiments are not limited to a technology whose standards refer to "subframes".

The need to use a control channel subframe pattern and then the pattern itself for distributing the enhanced control channel for a particular wireless device is determined at the time of network entry of the wireless device and may be selected such that the subframes used for the enhanced control channel are those with the lowest usage by other wireless devices in the cell serviced by the base station. Further, in some embodiments, a control channel sub frame pattern may be determined for a wireless device subsequent to network entry of the wireless device. Thus, a pattern may be determined that provides an indication of the subframes that a wireless device should monitor for downlink control information where the subframe pattern is based at least in part on control channel subframe utilization by other wireless devices in the cell. The subframe pattern may be stored in a data structure containing all wireless devices for a cell of the base station.

The following row of values indicates the number of wireless devices that are using the enhanced control channel in each of the 10 subframes (0-9) of a 10 subframe long periodic subframe sequence.

| 2 | 0 | 1 | 2 | 3 | 2 | 1 | 1 | 1 | 2 |
|---|---|---|---|---|---|---|---|---|---|

In other words, each number in the above array indicates how many wireless devices will monitor the enhanced control channels for downlink control information in a given subframe. This information may be maintained in the base station or other network node that is handling the resource allocation. Assuming now that a new wireless device enters the network and is expected to be allocated 5 subframes during which it will monitor the enhanced control channel for downlink control information, the pattern of subframe allocation of the enhanced control channel may be selected to achieve the most uniform distribution of resources achievable over the plurality of subframes, as follows:

| 0 | 1 | 1 | 0 | 0 | 0 | 1 | 1 | 1 | 0 |
|---|---|---|---|---|---|---|---|---|---|

In this row each numeral 1 denotes a subframe during which the new wireless device will monitor the enhanced control channel for downlink control information. When this pattern or distribution is combined with, or added to, the previous pattern, the following overall pattern is achieved.

| 2 | 1 | 2 | 2 | 3 | 2 | 2 | 2 | 2 | 2 |
|---|---|---|---|---|---|---|---|---|---|

Note that these are only examples for purposes of illustrating the technique described herein, and different patterns may actually exist for a given implementation. Also, the subframe pattern may include more or less than ten subframes. The number of wireless devices assigned to each subframe is but one criterion that may be used to determine a control channel subframe pattern, as explained below.

Thus, the subframe pattern indicates a pattern of subframes during which the wireless device is to monitor an enhanced control channel for downlink control information. The subframe pattern for the wireless device is based at least in part on enhanced control channel subframe utilization by other wireless devices.

The control channel subframe pattern is transmitted to the wireless device. For instance, in LTE-compliant implementations, the subframe pattern may be transmitted via the sub framePatternConfig-r11 information element as described in 3GPP TS 36.331 Release 11. The downlink control information is then transmitted to the wireless device over the enhanced control channel according to the control channel subframe pattern. Since the wireless device receives the control channel subframe pattern, the wireless device knows where to look in the subsequently transmitted subframes for the downlink control information intended for the wireless device.

In some embodiments, wireless devices will be allocated enhanced control channel resources if and only if the primary control channels have a collision rate that exceed a predefined primary control channel collision threshold or if primary control channel radio resource utilization for the primary control channels exceeds a primary radio resource utilization threshold. An array of radio resources utilization values may be maintained for each cell that keeps track of a moving average of primary radio resources utilization and high water mark values for the past nM subframes, where M is the subframe pattern length and n is an integer. The high water mark refers to the highest number of radio resources in a frame of the past nM subframes. The value of nM is a multiple of a maximum control channel subframe pattern periodicity, M, e.g., 40 subframes.

When the high water mark or the moving average of primary control channel radio resources utilization exceeds a threshold, enhanced control channel radio resources (e.g., eCCEs) may begin to be allocated. As wireless devices are allocated enhanced control channel radio resources, the base station monitors and calculates a moving average of enhanced control channel radio resources utilization and high water marks for the past nM sub frames for each subframe. Further, a moving average of enhanced control channel radio resources collisions in each subframe may also be calculated.

In some embodiments, a number of subframes in a control channel subframe pattern is increased in steps as primary control channel radio resources utilization increases and/or as the number of wireless devices using enhanced control channel radio resources increases. For example, in some embodiments, a number of subframes over which a wireless device will monitor the enhanced control channel will increase four subframes at a time with every ten percent increase in primary control channel radio resources utilization beyond a primary control channel radio resources utilization threshold.

Thus, in some embodiments, the number of subframes during which the wireless device is to monitor the enhanced control channel for downlink control information depends at least in part on a utilization ratio of radio resources available for primary control channels. Also, in some embodiments, the number of subframes during which the wireless device is to monitor the enhanced control channel for downlink control information may depend on a utilization ratio of radio resources available for enhanced control channels.

The control channel subframe pattern identifies the subframes during which a wireless device is to monitor an enhanced control channel for downlink control information out of a subframe pattern having a periodicity M. In some embodiments, the subframe pattern may be calculated using the following criteria. Assuming the required number of subframes during which a wireless device is to monitor the enhanced control channel for downlink control information is equal to N, then N subframes out of M available sub frame locations are found, where M is the periodicity of the control channel subframe pattern, such that the N subframes are the least used subframes in terms of number of users allocated thereto.

The calculated control channel subframe pattern may be sent to the wireless device upon entry of the wireless device into the network or subsequent to such entry. In some embodiments, the N subframes are selected to be the subframes of the M-length subframe sequence that have the least rate of enhanced control channel radio resources collisions. In some embodiments, the N subframes are selected to be the subframes of the M-length subframe sequence having the lowest moving average of enhanced control channel radio resources. In some embodiments, the N subframes are selected to be the subframes of the M-length subframe sequence having the lowest utilization of enhanced control channel radio resources.

Figure 5:
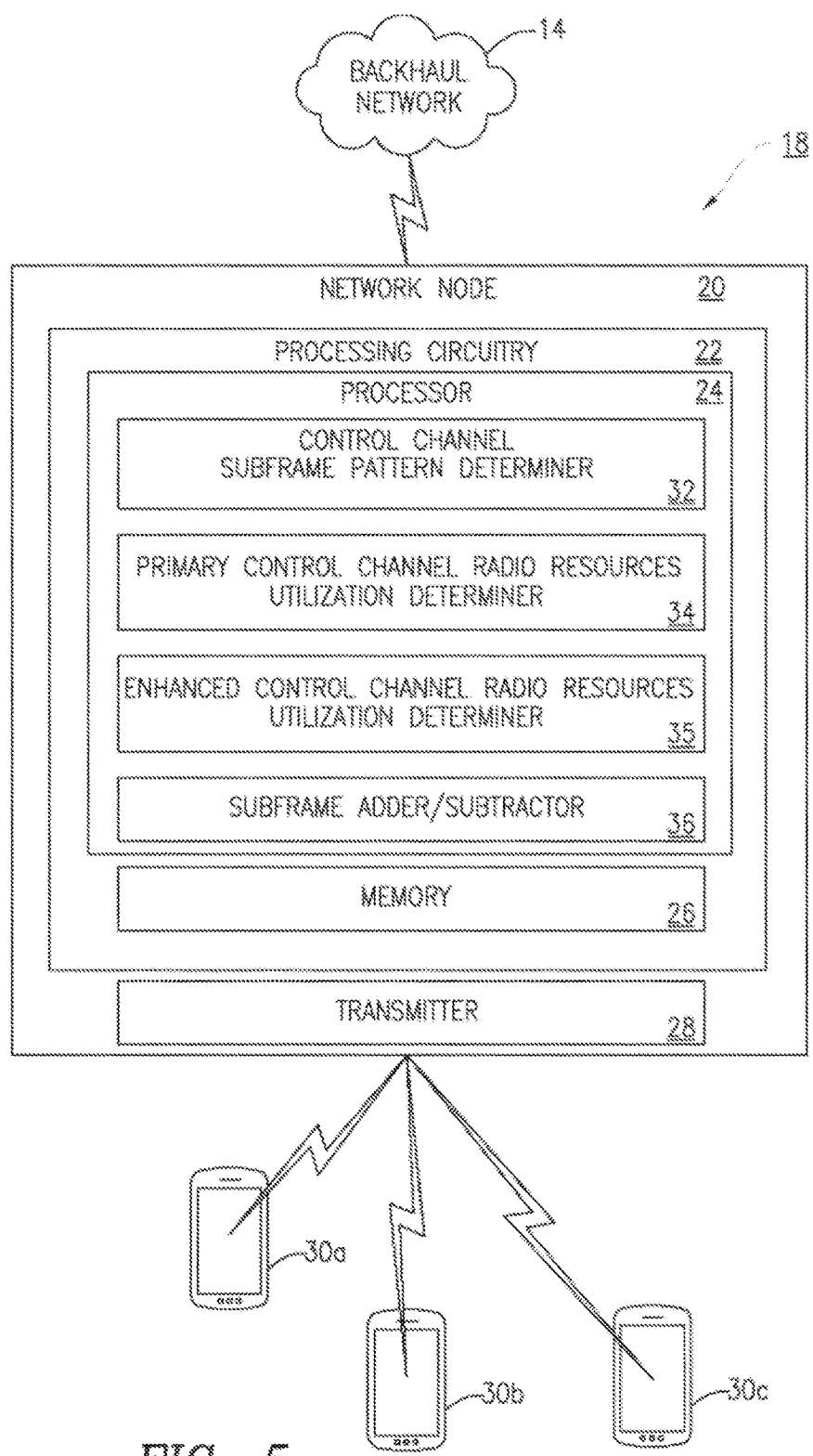
FIG. 5 is a block diagram of a wireless communication system having a network node that assigns a wireless device to a plurality of subframes according to a control channel subframe pattern for monitoring an enhanced control channel.

Returning now to the drawing figures, there is shown in FIG. 5 a wireless communication system 18 having a wireless backhaul network 14, a network node 20, such as a base station, and a plurality of wireless devices 30a, 30b and 30c, referred to collectively herein as wireless device 30. Network node 20 includes processing circuitry 22. In some embodiments, the processing circuitry may include a processor 24 and memory 26 containing instructions which, when executed by the processor 24, configure processor 24 to perform the one or more functions described herein. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 26, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by processing circuitry and/or other data, e.g., data pertaining to communication, e.g., configuration and/or address data of nodes, etc. Processing circuitry 22 may be configured to perform any of the methods described herein and/or to cause such methods to be performed, e.g., by node 20. Corresponding instructions may be stored in the memory 26, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be adapted to be accessible for reading and/or writing by the controller and/or processing circuitry 22.

The network node 20 has a transmitter 28 configured to transmit a control channel subframe pattern to a wireless device and to transmit the downlink control information to the wireless device according to the enhanced control channel subframe pattern. The processor 24 may be configured to implement a control channel subframe pattern determiner 32. The control channel subframe pattern determiner 32 is configured to determine an control channel subframe pattern for a wireless device. In one embodiment, the control channel subframe pattern indicates a pattern of subframes during which the wireless device is to monitor the enhanced control channel for downlink control information.

The control channel subframe pattern for the wireless device may be based at least in part on enhanced control channel subframe utilization by other wireless devices. In particular, in some embodiments, the control channel subframe pattern may be based on a number of wireless devices already assigned to each subframe. In some embodiments, the control channel subframe pattern may be based on subframes which are least used, or have the lowest enhanced control channel radio resources collision rate, or have a lowest moving average of enhanced control channel radio resources utilization over the plurality of subframes.

The processor 24 may also be configured to implement a primary control channel radio resources utilization determiner 34. In some embodiments, the primary control channel radio resources utilization determiner 34 may monitor radio resource utilization, where the radio resources are primary control channel radio resources. In particular, the primary control channel radio resources utilization determiner 34 may be configured to track primary control channel radio resource usage to determine how many subframes to use for the enhanced control channel. The primary control channel radio resources utilization determiner 34 may calculate a moving average of radio resource utilization for a past nM subframes to determine at least one of a number of subframes or an increased or decreased number of subframes during which a wireless device will monitor the enhanced control channel for downlink control information.

For example, if the moving average of primary control channel radio resources utilization for a past nM subframes increases, more subframes may be added by the subframe adder/subtractor 36. In some embodiments, the primary control channel radio resources utilization determiner 34 may be configured to calculate a moving average of radio resources collisions in each subframe for a past nM subframes to determine a number of subframes during which a wireless device will monitor the enhanced control channel for downlink control information. In some embodiments, wireless devices are assigned to enhanced control channels only if primary control channel radio resources collision rates exceed a predefined primary channel collision threshold. In some embodiments, wireless devices are assigned to enhanced control channels only if primary control channel radio resources utilization exceeds a predefined primary control channel radio resources utilization threshold.

The processor 24 also includes an enhanced control channel radio resources utilization determiner 35. The enhanced control channel radio resources utilization determiner 35 may monitor enhanced control channel radio resource utilization for each subframe of a sequence of subframes to be used by the enhanced control channel subframe pattern determiner 32 to determine certain subframes during which a particular wireless device will monitor the enhanced control channel for downlink control information. The enhanced control channel radio resources utilization determiner 35 may also determine an enhanced control channel radio resources collision rate, an enhanced control channel radio resources moving average and a number of wireless devices already assigned to the particular subframe. Any of these parameters—radio resources utilization, collision rate, moving average and number of assigned users—may be used to by the control channel subframe pattern determiner 32 to determine certain subframes during which a particular wireless device will monitor the enhanced control channel for downlink control information.

The processor 24 is also configured to implement a subframe adder/subtractor 36. The subframe adder/subtractor 36 may add one or more subframes or remove one or more subframes to the number of subframes in the control channel subframe pattern during which a particular wireless device will monitor the enhanced control channel for downlink control information in response to variation in the utilization of the primary control channel radio resources. In some embodiments, a predetermined number of subframes may be added to the number of subframes in the control channel subframe pattern during which a particular wireless device will monitor the enhanced control channel for downlink control information in response to a predetermined increase in the utilization of primary control channel radio resources. As a non-limiting example, an additional four subframes may be added to the number of subframes in the control channel subframe pattern during which a particular wireless device will monitor the enhanced control channel for downlink control information in response to a 10 percent increase in the utilization of primary control channel radio resources. Likewise, in some embodiments, a predetermined number of subframes may be removed from the number of subframes in the control channel subframe pattern during which a particular wireless device will monitor the enhanced control channel for downlink control information in response to a predetermined decrease in the utilization of primary control channel radio resources. Understandably, subframes may be added or removed when other conditions related to primary control channel radio resources utilization and/or enhanced control channel radio resources utilization exist.

Figure 6:
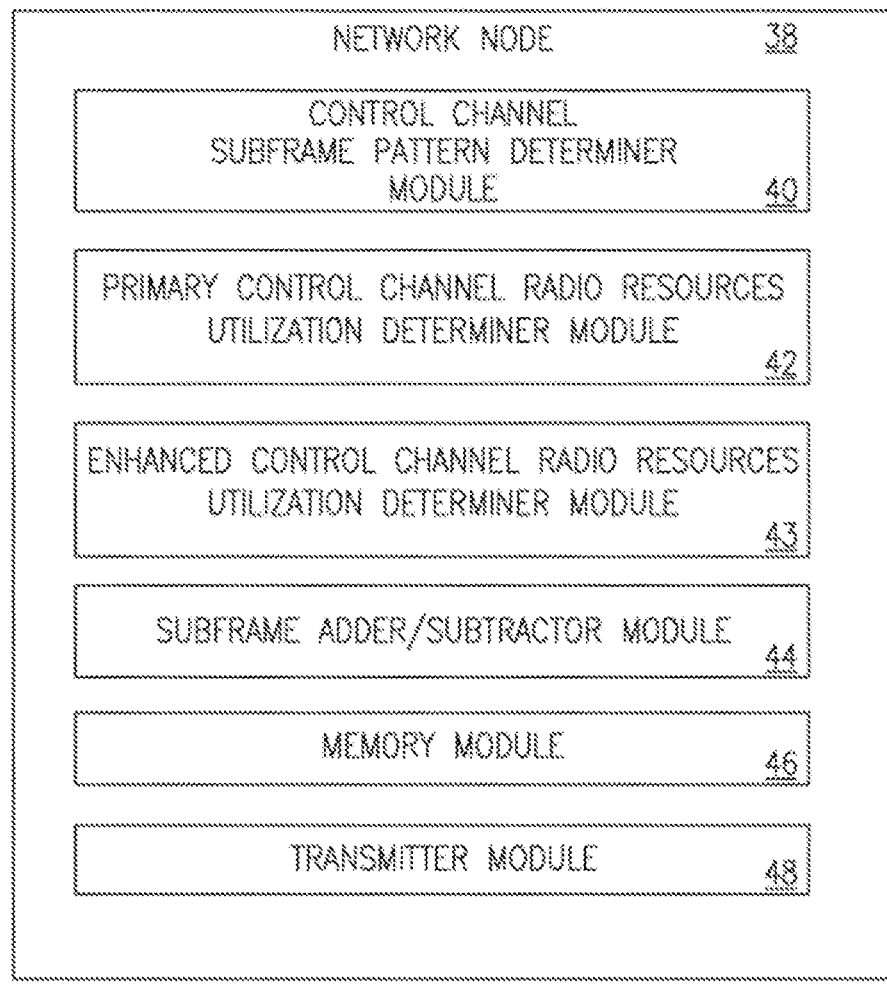
FIG. 6 is a block diagram of an alternative network node embodiment that assigns a wireless device to a plurality of subframes according to a control channel subframe pattern for monitoring an enhanced control channel.

In an alternative embodiment as shown in FIG. 6, a network node 38 for determining and transmitting control channel subframe patterns may be implemented as software modules executable by a processor. Thus, network node 38 includes a control channel subframe pattern determiner module 40 containing executable instructions that, when executed by a processor, configure the processor to determine a control channel subframe pattern for a wireless device.

A primary control channel radio resources utilization determiner module 42 contains executable instructions that, when executed by a processor, configure the processor to determine a utilization of the primary control channel radio resources. The network node 38 also includes an enhanced control channel radio resources utilization determiner module 43 to determine, for each subframe, at least one of a utilization of enhanced control channel radio resources, an enhanced control channel radio resources collision rate, an enhanced control channel radio resources moving average and a number of wireless devices assigned to the subframe. The subframe adder/subtractor module 44 contains instructions to add or remove subframes in the control channel subframe pattern over which a particular wireless device will monitor the enhanced control channel for downlink control information. The memory module 46 stores at least the modules 40, 42 and 44. The transmitter module 48 transmits the determined enhanced control channel subframe pattern to the wireless devices 30.

Figure 7:
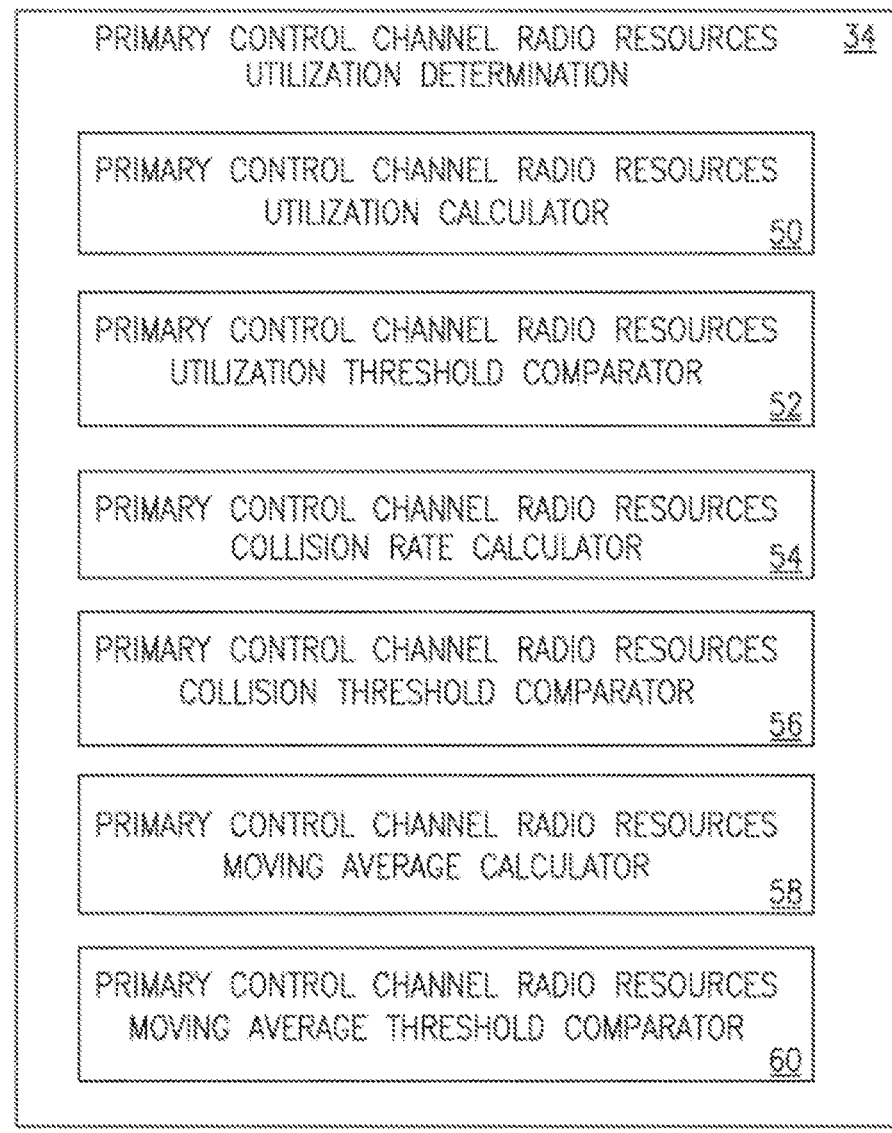
FIG. 7 is a block diagram of a primary control channel radio resources utilization determiner.

A more detailed block diagram depicting an embodiment of the primary control channel radio resources utilization determiner 34 is shown in FIG. 7. A primary control channel radio resources utilization calculator 50 of the primary control channel radio resources utilization determiner 34 determines a utilization of the primary control channel radio resources. A primary control channel radio resources utilization threshold comparator 52 of the primary control channel radio resources utilization determiner 34 compare the utilization of the primary control channel radio resources to a primary control channel radio resources utilization threshold. If the utilization of the primary control channel radio resources exceeds the primary control channel radio resources utilization threshold, then the number of subframes during which a particular wireless device will monitor the enhanced control channel for downlink control information may be increased.

A primary control channel radio resources collision rate determiner module 54 determines a collision rate for the primary control channel radio resources. A primary control channel radio resources collision threshold comparator 56 compares the primary control channel radio resources collision rate to a primary control channel radio resources collision threshold. If the collision rate for the primary control channel radio resources exceeds the primary control channel radio resources collision threshold, then a number of subframes during which a particular wireless device will monitor the enhanced control channel for downlink control information may be increased. A primary control channel radio resources moving average calculator 58 determines a moving average of primary control channel radio resources over a specified number of subframes. A primary control channel radio resources moving average threshold comparator 60 compares the moving average of the primary control channel radio resources to a primary control channel radio resources moving average threshold. If the moving average of the primary control channel radio resources exceeds the primary control channel radio resources moving average threshold, then a number of subframes during which a particular wireless device will monitor the enhanced control channel for downlink control information may be increased.

A more detailed block diagram depicting an embodiment of the enhanced control channel radio resources utilization determiner 35 is described with reference to FIG. 8. For each subframe of a subframe pattern of length M, an enhanced control channel radio resources utilization calculator 62 calculates a utilization of the enhanced control channel radio resources. For each subframe of the M-subframe length pattern, an enhanced control channel radio resources collision rate calculator module 66 calculates a collision rate for the control channel radio resources. For each subframe of the M-subframe length pattern, an enhanced control channel radio resources moving average calculator 70 calculates a moving average of enhanced control channel radio resources over a number of previous subframes. For each subframe of the M-length subframe pattern, an assigned wireless device calculator 72 calculates the number of wireless devices assigned to the subframe.

Thus, in this embodiment, there are four calculations for each subframe of the M-length subframe pattern. One purpose of the calculators is to provide per-subframe usage information to the enhanced control channel subframe pattern determiner 32, 40, when determining the least used subframes. A calculator 62, 66, 70 and 72 may be executed upon the occurrence of one or more events such as expiry of a periodic time, an updated control channel radio resources usage report from other modules and entry of a new user or release of a current user.

Figure 8:
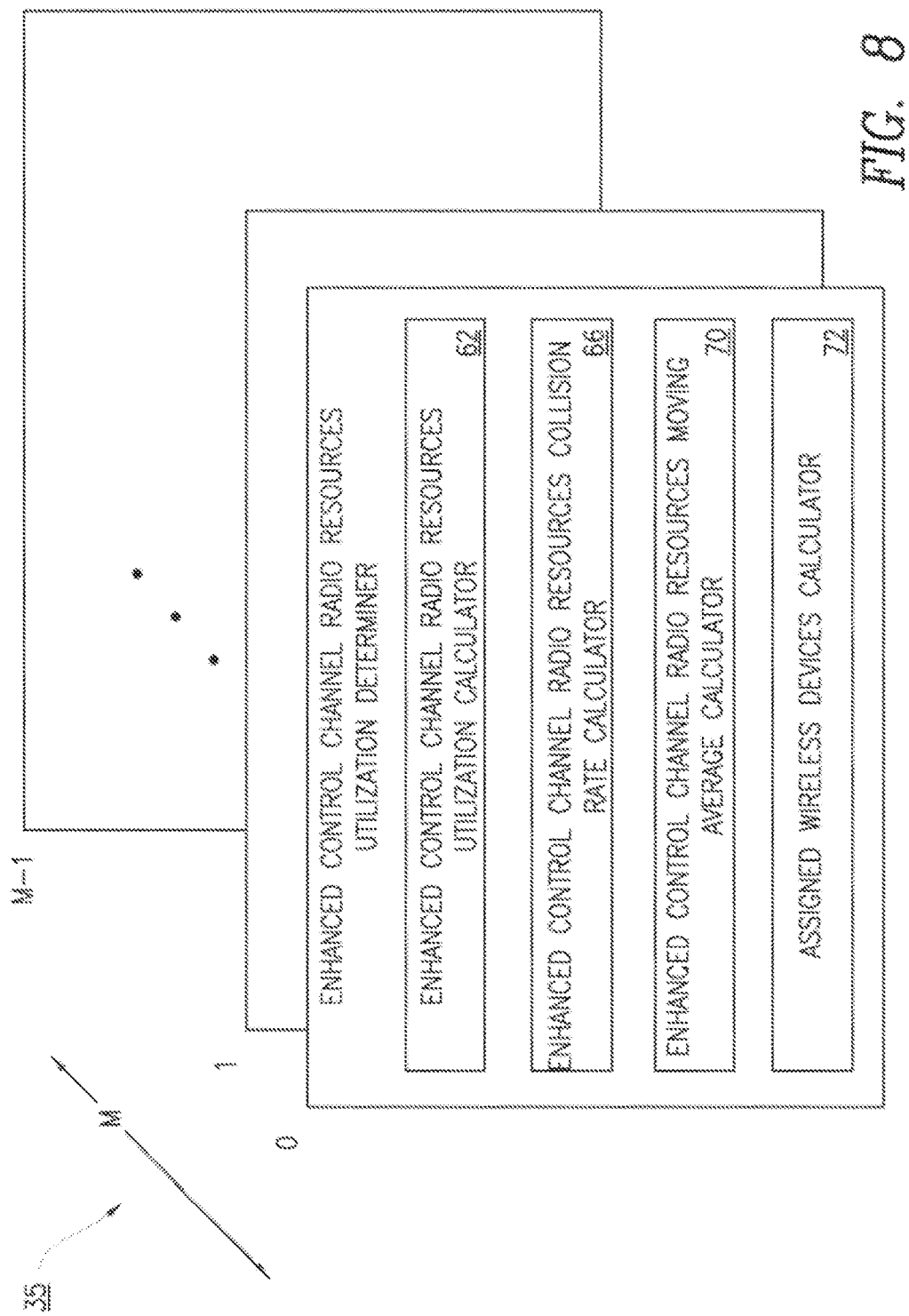
FIG. 8 is a block diagram of an enhanced control channel radio resources utilization determiner.

Of note, although FIG. 8 shows a number of different parameter calculators, it is understood that embodiments may include fewer than those shown and described and may even include different parameters.

Figure 9:
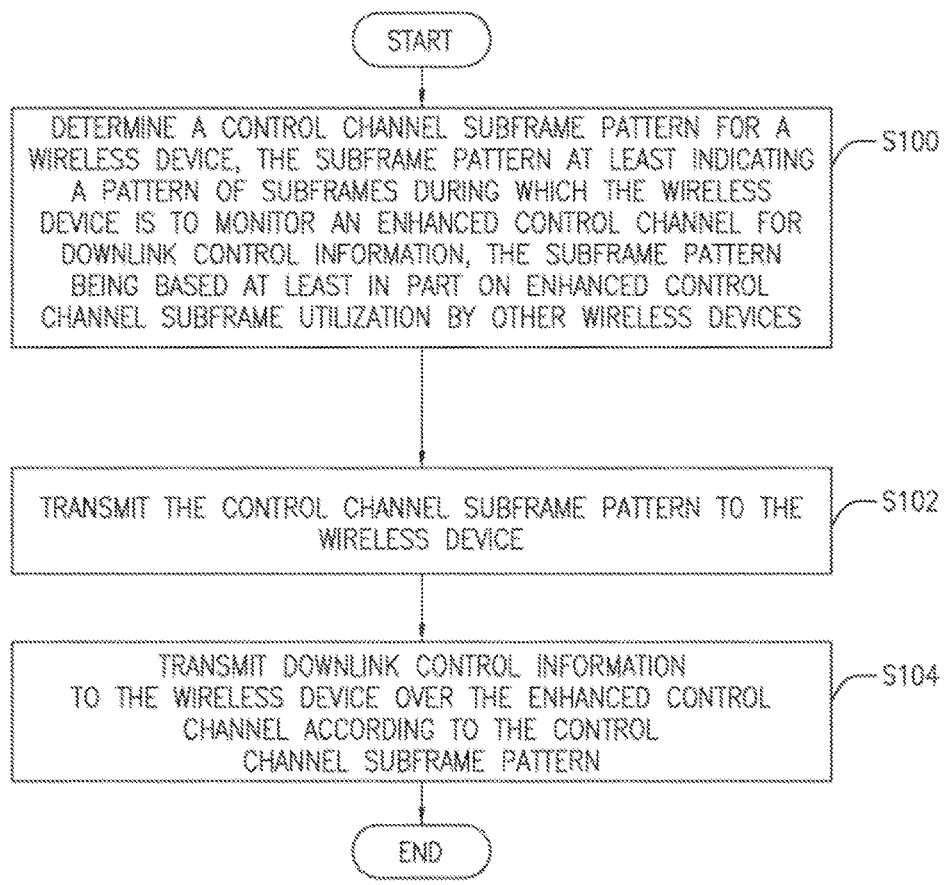
FIG. 9 is a flowchart of an exemplary process for determining and transmitting a control channel subframe pattern.

FIG. 9 is a flowchart of an exemplary process for allocating an enhanced control channel to a wireless device. The process includes determining an control channel subframe pattern for the wireless device, for instance via of the control channel subframe pattern determiner 32 (block S100). As noted above, the control channel subframe pattern includes an indication of a pattern of subframes during which the wireless device is to monitor the enhanced control channel for downlink control information. The subframe pattern is based at least in part on enhanced control channel subframe utilization by other wireless devices. The control channel subframe pattern is transmitted, for instance, via the transmitter 28 to the wireless device (block S102). Downlink control information can then be transmitted to the wireless device over the enhanced control channel according to the control channel subframe pattern (block S104).

Note that in some embodiments, primary channel control resources may also be used to transmit downlink control information to the wireless device. Thus, the process may further include transmitting downlink control information over the primary control channel in accordance with the control channel subframe pattern. In such cases, the control channel subframe pattern includes an indication of the subframes during which the wireless device is to monitor the primary control channel for downlink control information.

It is noted that pattern determination and reconfiguration can be done dynamically and is not a static "one time only" determination at the point wireless device 30 enters the coverage area of the base station. This dynamic arrangement allows for reallocation of enhanced control channel resources among existing wireless devices 30 in a cell and allows for allocation of enhanced control channel resources to the wireless device 30 entering the cell.

Figure 10:
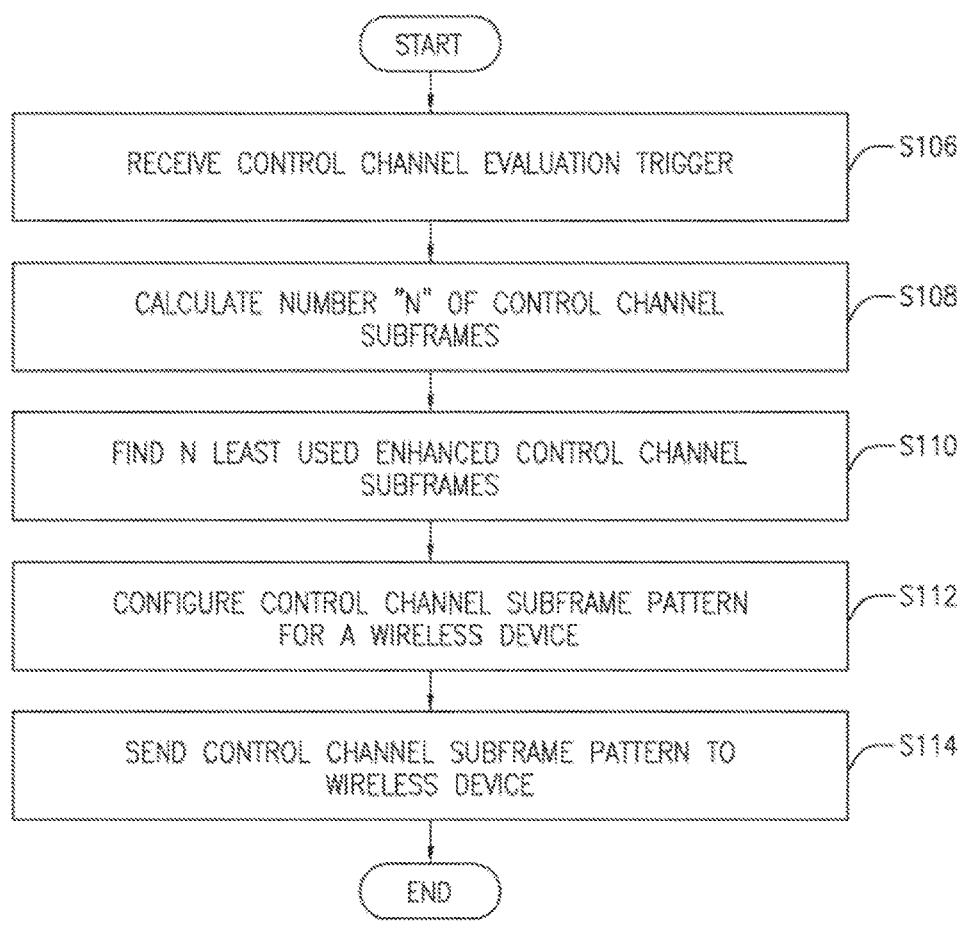
FIG. 10 is a flowchart of an exemplary process for determining a control channel subframe pattern.

FIG. 10 is a flowchart of an exemplary process for allocating an enhanced control channel to a wireless device. The process includes receiving at the control channel subframe pattern determiner 32 a control channel evaluation trigger (block S106). Upon receipt of the control channel evaluation trigger, the control channel subframe pattern determiner 32 calculates a number, N, of control channel subframes during which a particular wireless device will monitor the enhanced control channel for downlink control information (block S108).

The number, N, of control channel subframes during which a particular wireless device will monitor the enhanced control channel for downlink control information may be based on a utilization (e.g., percentage utilization) of the primary control channel radio resources exceeding a primary control channel usage threshold, where the utilization of the primary control channel radio resources is determined by the primary control channel radio resources utilization calculator 50, and the comparison to the primary control channel radio resources usage threshold is performed by the primary control channel radio resources utilization threshold comparator 52. The least used N subframes of the M-length sub frame pattern are determined by the control channel subframe pattern determiner 32, 40, based on information from the enhanced control channel radio resources utilization determiner 35 (block S110). Once the least used subframes are determined, the control channel subframe determiner 32, 40 configures the enhanced control channel subframe pattern for a wireless device (block S112). A transmitter 28, 48 transmits the control channel subframe pattern to the wireless device (block S114).

Figure 11:
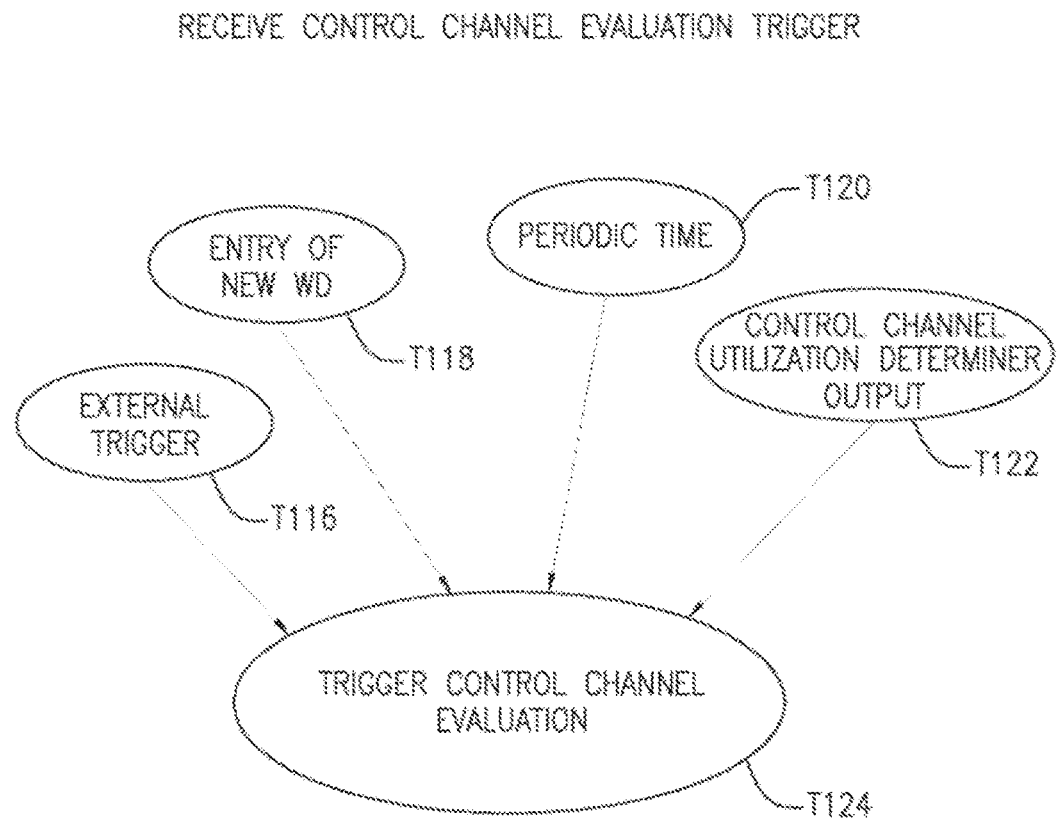
FIG. 11 is a diagram of exemplary triggers that trigger control channel evaluation to determine a control channel subframe pattern.

FIG. 11 shows a diagram of control channel evaluation triggers that may be received according to block S106 of FIG. 10. For example, external triggers (T116) such as configuration changes, triggers from neighboring cells for inter-cell interference coordination, and other automatic mechanisms may be generated. Another trigger (T118) is generated upon entry of a new wireless device. In particular when a new wireless device enters the network and is to be served by the network node, a determination should be made if the new wireless device needs to monitor an enhanced control channel for downlink control information on one or more subframes and if so, how many subframes are needed. A periodic timer (T120) may generate a trigger upon expiry of a predetermined amount of time. The duration of the timer may be selected to maintain an optimal balance between enhanced control channel utilization and primary control channel utilization.

Further, the enhanced control channel radio resources utilization determiner 35, (T122) may generate a trigger when, for example, an enhanced control channel radio resources collision rate exceeds a threshold. When other of the enhanced control channel radio resources utilization 35 calculators exceed respective thresholds, a trigger may also be generated. Upon generation of the trigger from one or more of these sources 116, 118, 120, 122, control channel evaluation is triggered (T124). Thus, in some embodiments the determination of a control channel subframe pattern is performed in response to a change in network conditions. The network conditions triggering performance of determining the control channel subframe pattern may include entry into the network of a wireless device. Other triggers may be implemented, such as a trigger generated when a wireless device is handed over to another network node or leaves the network. In other words, the disclosure is not limited solely to the triggers shown in FIG. 11 or described herein.

The network conditions may also, or in the alternative, include a utilization ratio, or a variation of the utilization ratio, of radio resources available for primary control channel radio resources exceeding a predetermined threshold. The network conditions may also, or in the alternative, include a collision rate of primary control channels exceeding a predefined collision rate threshold. The network conditions may also, or in the alternative, include a collision rate of enhanced control channel radio resources exceeding a predefined collision rate threshold.

FIG. 12 illustrates two examples of finding N least used enhanced control channel subframes according to block S110 of FIG. 10. In this example, the length of a subframe pattern is ten, i.e., M=10, and there are determined to be needed two enhanced control channel subframes according to block S108 of FIG. 10. The first row, R1, illustrates a number of wireless devices assigned to each subframe of the 10-subframe long periodic sequence, as determined by the assigned wireless devices calculator 72 of the enhanced control channel radio resources utilization determiner 35. In this case, as indicated by the arrows, the two least used subframes are the third and ninth subframes. These particular subframe positions are communicated to the control channel subframe pattern determiner 32, 40. This information is used to determine a subframe pattern where the two determined subframe positions indicate subframes the wireless device is to monitor the enhanced control channel for downlink control information.

The second row, R2, illustrates enhanced control channel radio resources collision rates for each subframe as determined by the enhanced control channel radio resources collision rate calculator 66. In this case the two subframes with the lowest collision rates as indicated by the arrows are the third and tenth subframes. These particular subframe positions are communicated to the control channel subframe pattern determiner 32, 40. This information is used to determine a subframe pattern where the two determined subframe positions indicate subframes the wireless device is to monitor the enhanced control channel for downlink control information. Although FIG. 12, shows two examples of determining a subframe pattern, it is understood that the disclosure is not limited solely to the two examples shown. The subframe pattern can be determined using others of the calculators shown and described with reference to FIG. 8, or even a combination or weighted metric using one of more of the calculators.

Thus, in some embodiments, determining the control channel subframe pattern includes determining a location of subframes in the subframe pattern during which the first wireless device is to monitor the enhanced control channel for downlink control information. In some embodiments, determining the location of subframes in the subframe pattern during which a wireless device is to monitor the enhanced control channel for downlink control information comprises determining which subframes in the combination of subframe patterns determined for other wireless devices are the least used. In some embodiments, determining the location of subframes in the subframe pattern during which the first wireless device is to monitor the enhanced control channel for downlink control information comprises determining which subframes have the lowest enhanced control channel radio resources collision rates. In some embodiments, determining the location of subframes in the subframe pattern during which the first wireless device is to monitor the enhanced control channel for downlink control information comprises determining which subframes have the lowest enhanced control channel radio resources utilization. In some embodiments, determining the location of subframes in the subframe pattern during which the first wireless device is to monitor the enhanced control channel for downlink control information comprises determining which subframes have the lowest moving average of enhanced control channel radio resources over the past nM frames, where nM is an integer multiple of the length M of the subframe pattern. Other parameters may be calculated to determine which subframes are to be selected as those to be monitored for downlink control information by the wireless device.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method, at a network node, of allocating an enhanced control channel to a first wireless device, the method comprising:
    determining a control channel subframe pattern for the first wireless device, the subframe pattern for the first wireless device identifying subframes in the subframe pattern during which the first wireless device is to monitor the enhanced control channel for downlink control information determining the control channel subframe pattern comprising:
        determining a number of subframes in the subframe pattern during which the first wireless device is to monitor the enhanced control channel for downlink control information based at least in part on at least one of a utilization ratio of radio resources available for a primary control channel and a utilization ratio of radio resources available for the enhanced control channel; and
        determining a location of subframes in the subframe pattern during which the first wireless device is to monitor the enhanced control channel for downlink control information based at least in part on enhanced control channel subframe utilization by other wireless devices;
    transmitting the control channel subframe pattern to the first wireless device; and transmitting downlink control information to the first wireless device over the enhanced control channel according to the control channel subframe pattern.

2. The method of claim 1, further comprising transmitting downlink control information to the first wireless device over a primary control channel in accordance with the control channel subframe pattern.

3. The method of claim 2, wherein the control channel subframe pattern further comprises an indication of the subframes during which the first wireless device is to monitor the primary control channel for downlink control information.

4. The method of claim 1, wherein determining the location of subframes in the subframe pattern during which the first wireless device is to monitor the enhanced control channel for downlink control information comprises determining which subframes in a combination of subframe patterns determined for other wireless devices are the least used.

5. The method of claim 1, wherein the determination of the control channel subframe pattern is performed in response to a trigger.

6. The method of claim 5, wherein the trigger is a change in network conditions.

7. The method of claim 6, wherein the change in network conditions comprises a change in usage of one of primary control channel radio resources and enhanced control channel radio resources.

8. The method of claim 6, wherein the change in network conditions comprises primary control channel radio resources usage exceeding a predetermined threshold.

9. The method of claim 1, further comprising allocating enhanced control channel radio resources when a moving average of primary control channel radio resource utilization exceeds a threshold.

10. A network node configured to allocate an enhanced control channel to a first wireless device, the network node comprising:
processing circuitry comprising a processor and memory:
the memory configured to store a control channel subframe pattern;
the processor configured to:
determine the control channel subframe pattern for the first wireless device, the subframe pattern for the first wireless device identifying subframes in the subframe pattern during which the first wireless device is to monitor the enhanced control channel for downlink control information determining the control channel subframe pattern comprising:
determining a number of subframes in the subframe pattern during which the first wireless device is to monitor the enhanced control channel for downlink control information based at least in part on at least one of a utilization ratio of radio resources available for a primary control channel and a utilization ratio of radio resources available for the enhanced control channel; and
determining a location of subframes in the subframe pattern during which the first wireless device is to monitor the enhanced control channel for downlink control information based at least in part on enhanced control channel subframe utilization by other wireless devices; and
a transmitter configured to:
transmit the control channel subframe pattern to the first wireless device; and
transmit downlink control information to the first wireless device over the enhanced control channel according to the control channel subframe pattern.

11. The network node of claim 10, wherein the transmitter is further configured to transmit downlink control information to the first wireless device over a primary control channel in accordance with the control channel subframe pattern.

12. The network node of claim 11, wherein the control channel subframe pattern further comprises an indication of the subframes during which the first wireless device is to monitor the primary control channel for downlink control information.

13. The network node of claim 10, wherein determining the location of subframes in the subframe pattern during which the first wireless device is to monitor the enhanced control channel for downlink control information, the processor is further configured to determine which subframes in a combination of subframe patterns determined for other wireless devices are the least used.

14. The network node of claim 10, wherein the determination of the control channel subframe pattern is performed in response to a trigger.

15. The network node of claim 14, wherein the trigger is a change in network conditions.

16. The network node of claim 15, wherein the change in network conditions comprises a change in usage of one of primary control channel radio resources and enhanced control channel radio resources.

17. The network node of claim 15, wherein the change in network conditions comprises primary control channel radio resources usage exceeding a predetermined threshold.

18. The network node of claim 10, wherein the processor is further configured to allocate enhanced control channel radio resources when a moving average of primary control channel radio resource utilization exceeds a threshold.

19. A network node configured to allocate an enhanced control channel to a first wireless device, the network node comprising:
a control channel subframe pattern determination module configured to determine a control channel subframe pattern for the first wireless device, the subframe pattern for the first wireless device identifying subframes in the subframe pattern during which the first wireless device is to monitor the enhanced control channel for downlink control information determining the control channel subframe pattern comprising:
determining a number of subframes in the subframe pattern during which the first wireless device is to monitor the enhanced control channel for downlink control information based at least in part on at least one of a utilization ratio of radio resources available for a primary control channel and a utilization ratio of radio resources available for the enhanced control channel; and
determining a location of subframes in the subframe pattern during which the first wireless device is to monitor the enhanced control channel for downlink control information based at least in part on enhanced control channel subframe utilization by other wireless devices; and
a transmitter module configured to:
transmit the control channel subframe pattern to the first wireless device; and
transmit downlink control information to the first wireless device over the enhanced control channel according to the control channel subframe pattern.

20. The network node of claim 19, wherein the control channel subframe pattern determination module is further configured to allocate enhanced control channel radio resources when a moving average of primary control channel radio resource utilization exceeds a threshold.

* * * * *